United States Patent
Beerens et al.

(10) Patent No.: US 11,879,759 B2
(45) Date of Patent: Jan. 23, 2024

(54) ULTRASONIC TRANSDUCER, ULTRASONIC FLOWMETER AND METHOD

(71) Applicant: KROHNE Messtechnik GmbH, Duisburg (DE)

(72) Inventors: Anton Beerens, De Moer (NL); Martin Gevers, Witten (DE); Lars Orsoe, Hillerød (DK); Michael Vogt, Bochum (DE)

(*) Notice: Subject to any disclaimer, the term of this patent is extended or adjusted under 35 U.S.C. 154(b) by 95 days.

(21) Appl. No.: 17/447,756

(22) Filed: Sep. 15, 2021

(65) Prior Publication Data
US 2022/0082420 A1 Mar. 17, 2022

(30) Foreign Application Priority Data
Sep. 16, 2020 (DE) ............ 10 2020 124 121.6

(51) Int. Cl.
*G01F 1/663* (2022.01)
*G01F 1/66* (2022.01)
*G01N 29/28* (2006.01)

(52) U.S. Cl.
CPC .......... *G01F 1/663* (2013.01); *G01F 1/662* (2013.01); *G01N 29/28* (2013.01); *G01N 2291/02836* (2013.01)

(58) Field of Classification Search
CPC ........ G01F 1/663; G01F 1/662; G01N 29/28; G01N 2291/02836
USPC ..................................... 73/861.28
See application file for complete search history.

(56) References Cited

U.S. PATENT DOCUMENTS

| | | | |
|---|---|---|---|
| 5,117,698 A | 6/1992 | Baumoel | |
| 2015/0260556 A1 | 9/2015 | Schaefer et al. | |
| 2016/0058415 A1* | 3/2016 | Nakamura | A61B 8/4477 600/459 |
| 2017/0307426 A1* | 10/2017 | van Klooster | H04R 7/14 |
| 2020/0149979 A1* | 5/2020 | Roth, II | G01K 11/24 |

FOREIGN PATENT DOCUMENTS

| | | | | |
|---|---|---|---|---|
| DE | 102007062913 A1 * | 6/2009 | | G01F 1/662 |
| DE | 102007062913 A1 | 6/2009 | | |
| DE | 102009040748 A1 * | 3/2011 | | G01N 29/221 |

OTHER PUBLICATIONS

Translation of Berger et al. DE-102007062913-A1 (Year: 2009).*
Translation of Graff et al. DE-102009040748-A1 (Year: 2011).*

* cited by examiner

*Primary Examiner* — Nathaniel T Woodward
(74) *Attorney, Agent, or Firm* — Patrick D. Duplessis

(57) ABSTRACT

An ultrasonic transducer for an ultrasonic flowmeter includes: a transducer housing with an ultrasound window; a transducer element in the transducer housing that transmits ultrasonic signals onto a signal path and receives ultrasonic signals from the signal path; a control and evaluation unit that controls the transducer element and evaluates the ultrasonic signals; and a buffer element that forms at least one at least partially reflective boundary layer in the signal path. In an operating state, the transducer element transmits an ultrasonic signal that is at least partially reflected at the boundary layer of the buffer element, and the reflected signal component is received by the transducer element. The control and evaluation unit monitors the reception of the reflected signal component and, in the absence of reception of a reflected signal component, detects an error state of the ultrasonic transducer.

15 Claims, 5 Drawing Sheets

ULTRASONIC TRANSDUCER, ULTRASONIC FLOWMETER AND METHOD

TECHNICAL FIELD

The invention relates to an ultrasonic transducer for an ultrasonic flowmeter, having a transducer housing and having a transducer element, wherein the transducer housing has an ultrasound window, and wherein the transducer element is arranged in the transducer housing and is designed to transmit ultrasonic signals onto a signal path and to receive ultrasonic signals from the signal path, and having a control and evaluation unit for controlling the transducer element and evaluating the ultrasonic signals. Furthermore, the invention relates to an ultrasonic flowmeter, a method for monitoring the function of an ultrasonic transducer, and a method for operating an ultrasonic flowmeter.

BACKGROUND

Ultrasonic flowmeters are known in a multitude of forms from the prior art and are used to determine the flow of a flowing medium through a measuring tube. For this purpose, ultrasonic flowmeters generally have at least two ultrasonic transducers, which are designed as ultrasonic transmitters and/or ultrasonic receivers and are arranged at a distance from one another, as seen in the direction of flow (axially relative to the measuring tube axis). To determine the flow, an ultrasonic signal is transmitted along a signal path between the ultrasonic transducers once in the direction of flow of the medium and once against the direction of flow of the medium, and the transit time of the ultrasonic signal or signals, which differ from one another due to the entrainment effect of the medium, is determined. The flow velocity of the medium can be determined from the difference in transit time, and the volumetric flow rate of the medium is obtained from the flow velocity and the measuring tube cross-section.

The ultrasonic signals are generated and received by a transducer element located in the transducer housing of the ultrasonic transducers. In practice, the transducer elements are usually implemented by electromechanical transducer elements whose operating principle is based on the piezoelectric effect. The ultrasonic signals are then transmitted into the measuring tube via the ultrasound window of the transducer housing or received via the ultrasound window of the transducer housing.

Ultrasound can be transmitted well in liquids; liquids exhibit low attenuation for ultrasound. In air, on the other hand, the ultrasonic signals are strongly attenuated. If there is no medium in the measuring tube, the transmission of ultrasound from one ultrasonic transducer to the other ultrasonic transducer is extremely strongly attenuated, so that no or almost no ultrasonic signal can be received. In practice, however, the case of an empty measuring tube cannot be easily distinguished from the case of a defective transducer element. In both cases, the receiving ultrasonic transducer receives no or only a very low ultrasonic signal.

A disadvantage of ultrasonic transducers and ultrasonic flowmeters known in the prior art is that it is not easy to distinguish whether an empty tube or a defective state of the ultrasonic transducer is present.

SUMMARY

Accordingly, it is the object of the invention to provide an ultrasonic transducer and an ultrasonic flowmeter having an increased fault detection capability. Furthermore, an object of the invention is to provide corresponding methods for monitoring the function and for operating the ultrasonic transducer and the ultrasonic flowmeter.

In the ultrasonic transducer according to the invention, the object is initially and essentially achieved in that a buffer element is arranged in or on the transducer housing in the signal path, and that the buffer element forms at least one at least partially reflective boundary layer in the signal path. In the operating state of the ultrasonic transducer, the transducer element emits an ultrasonic signal, wherein the ultrasonic signal is at least partially reflected at the boundary layer of the buffer element. The reflected signal component is then received again by the transducer element. The transmitted signal component is emitted through the ultrasound window.

When it is said that the buffer element is arranged in the transducer housing, it is meant that the buffer element is arranged on the inside of the transducer housing. When it is said that the buffer element is arranged on the transducer housing, it is meant that the buffer element is at least indirectly, preferably directly, connected to the transducer housing. It is not meant that the buffer element is arranged at a distance from the transducer housing and not connected to the transducer housing away from the transducer housing.

According to the invention, it is further provided that the control and evaluation unit is designed to monitor the reception of the reflected signal component in the operating state of the ultrasonic transducer. In the absence of a reflected signal component, the control and evaluation unit detects an error state of the ultrasonic transducer.

The design of the ultrasonic transducer according to the invention makes it possible to determine, in a simple manner, whether the transducer element has generated and transmitted an ultrasonic signal. If this is not the case, no signal component is reflected at the boundary layer of the buffer element and consequently cannot be received again by the transducer element. The failure to receive the reflected signal component is determined by the control and evaluation unit. Thus, a user can easily understand whether an error state of the ultrasonic transducer is present. In a preferred embodiment, the control and evaluation unit is further designed to signal a detected error state by means of an error signal. Signaling can take place in various ways, for example by outputting an optical or acoustic warning signal. However, an error code can also be generated and output, for example. The invention is not limited to the aforementioned types of signaling of the error state.

In an alternative design of the ultrasonic transducer according to the invention, a buffer element is also arranged in the signal path and forms at least one at least partially reflective boundary layer in the signal path. In contrast to the previously described design, a second transducer element is arranged in the transducer housing. In the operating state of the ultrasonic transducer, the transducer element emits an ultrasonic signal which is at least partially reflected at the boundary layer of the buffer element. The second transducer element is arranged in the transducer housing such that the reflected signal component is received by the second transducer element. Particularly preferably, the second transducer element is designed to receive ultrasonic signals only. In the alternative design, the control and evaluation unit is designed such that it monitors the reception of the reflected signal component in the operating state of the ultrasonic transducer and detects an error state of the ultrasonic transducer in the absence of reception of a reflected signal component.

The alternative design is particularly advantageous when the transmitted ultrasonic signal does not strike perpendicularly on the partially reflecting boundary layer and is thus reflected at an angle of incidence corresponding to the angle of reflection. This situation occurs particularly with ultrasonic transducers of clamp-on ultrasonic flowmeters. Clamp-on ultrasonic flowmeters are clamped from the outside onto the measuring tube in which the medium to be measured flows. Usually, such flowmeters have two ultrasonic transducers. The ultrasonic transducers, or the transducer elements of the ultrasonic transducers, are then oriented at an oblique angle to the measuring tube surface, so that the ultrasonic signals are emitted into the measuring tube at an oblique angle. This is ensured by the geometry of the buffer element. For this, the buffer element has a triangular cross-section, for example.

The buffer element is implemented in different ways in various configurations of the ultrasonic transducer according to the invention.

Preferably, the boundary layer is formed on the side of the buffer element facing away from the transducer element. The emitted ultrasonic signal then preferably passes through the entire length of the buffer element along the signal path before being partially reflected at the side of the buffer element facing away from the transducer element. The reflected signal component passes through the buffer element again along the signal path before it is received again by the transducer element. The buffer element can thus ensure a time interval between transmission of the ultrasonic signal and reception of the partially reflected signal component.

In a particularly preferred design of the ultrasonic transducer according to the invention, the buffer element is formed by the ultrasound window. Further preferably, in one design, the ultrasound window has an increased thickness, wherein the thickness is defined as the extension of the ultrasound window along the signal path of the ultrasonic signal.

In one variation, the buffer element formed by the ultrasound window extends into the transducer housing. In an alternative design, the buffer element formed by the ultrasound window extends out of the transducer housing.

In principle, the ultrasound window may be formed integrally with the transducer housing, wherein integral means that the transducer housing and ultrasound window are manufactured as one part from one workpiece and have not been joined together. Alternatively, the ultrasound window can be implemented as a separate component, but one that is directly connected to the transducer housing. In particular, a medium-tight connection between the ultrasound window and the transducer housing is necessary to prevent medium from entering the interior of the transducer housing. For example, the ultrasound window may be welded to the transducer housing.

In a further design of the ultrasonic transducer according to the invention, the buffer element is formed as a separate component. This design has the advantage that the buffer element can be replaced if necessary.

Particularly preferably, the buffer element is arranged between the transducer element and the ultrasound window inside the transducer housing. Further preferably, the transducer element is arranged immediately adjacent to the buffer element.

In a further particularly preferred design of the ultrasonic transducer according to the invention, the buffer element forms a first boundary layer and at least one second boundary layer in the signal path of the ultrasonic signal. The ultrasonic signal is at least partially reflected at the first boundary layer, wherein the reflected signal component is reflected from the first boundary layer onto the second boundary layer. Particularly preferably, the reflected signal component strikes the second boundary layer perpendicularly. The reflected signal component is reflected back from the second boundary layer onto the first boundary layer and from there reflected back to the transducer element, from which it is received again.

Such a design is particularly advantageous when the ultrasonic transducer is used in a clamp-on ultrasonic flowmeter.

In order to further increase the partial reflection of the ultrasonic signal at the boundary layer, it is provided in a very particularly preferred variation of the ultrasonic transducer according to the invention that a coating is applied to the boundary layer formed by the buffer element, which enhances the partial reflection. Such a design is particularly advantageous if a medium is to be measured which has similar acoustic properties to the transducer element, or to the ultrasound window of the transducer element, so that—without additional coating—no or hardly any partial reflection occurs.

A particularly preferred ultrasonic transducer according to the invention is characterized in that the control and evaluation unit is designed in such a way that, in the operating state of the ultrasonic transducer, it determines a variable describing the reflected signal component and compares it with a reference value for this variable. In a preferred variation, such a variable is the intensity of the reflected signal component. The reference value is that value of the variable in the go state of the ultrasonic transducer. If the determined variable deviates from the reference value beyond a predetermined tolerance range, the control and evaluation unit outputs an error signal. Such a design of the ultrasonic transducer enables extended fault diagnostics of the ultrasonic transducer. Thus, by monitoring the partially reflected signal component, it is not only determined whether the transducer element of the ultrasonic transducer is functional, but by monitoring the variable describing the reflected signal component, it can also be determined whether the transducer element has changed its position in the ultrasonic transducer, for example, by becoming detached and slipping, or whether other defects are present which, however, do not lead to total failure of the transducer element. All such circumstances would have an influence on the variable describing the reflected signal component.

In addition to the ultrasonic transducer, the invention further relates to an ultrasonic flowmeter for determining the flow of a flowing medium. The ultrasonic flowmeter has a first ultrasonic transducer and a second ultrasonic transducer, and also has a control and evaluation unit. The ultrasonic transducers are designed to transmit an ultrasonic signal onto a signal path and/or to receive an ultrasonic signal from the signal path, and are operatively associated with each other via the signal path of the ultrasonic signal. When it is said that the ultrasonic transducers are operatively associated with each other via the signal path, it is meant that at least one of the ultrasonic transducers receives the ultrasonic signal transmitted by the other ultrasonic transducer via the signal path.

In the ultrasonic flowmeter in question, the object is initially and essentially achieved in that at least one ultrasonic transducer designed for transmission has a buffer element, that the buffer element is arranged in the signal path of the ultrasonic signal in or on the transducer housing, and that the buffer element forms at least one at least partially reflective boundary layer in the signal path.

In the operating state of the ultrasonic flowmeter, the transducer element of the transmitting ultrasonic transducer transmits an ultrasonic signal, wherein the ultrasonic signal is at least partially reflected at the boundary layer of the buffer element and is partially transmitted.

In a first variation of the ultrasonic flowmeter according to the invention, the reflected signal component is received by the transducer element of the transmitting ultrasonic transducer. In an alternative variation of the ultrasonic flowmeter according to the invention, a second transducer element is arranged in the transducer housing of the ultrasonic transducer designed for transmitting. Here, the reflected signal component is received by the second transducer element of the transmitting ultrasonic transducer.

In both variations, the transmitted signal component is received by the transducer element of the receiving ultrasonic transducer.

According to the invention, it is further provided in both variations that the control and evaluation unit is designed in such a way that it monitors the reception of the reflected signal component and the reception of the transmitted signal component in the operating state of the ultrasonic flowmeter and detects one of the following operating states of the ultrasonic flowmeter:
- if the reflected signal component is received and the transmitted signal component is received: ultrasonic flowmeter operational,
- if the reflected signal component is received and the transmitted signal component is not received: measuring tube empty,
- if the reflected signal component is not received and the transmitted signal component is not received: ultrasonic flowmeter in error state, in particular transducer element of the transmitting ultrasonic transducer in error state.

Particularly preferably, the control and evaluation unit is further designed to signal the determined operating state of the ultrasonic flowmeter. The signaling in this case can take place, for example, by means of various optical or acoustic signals or in other ways known from the prior art.

In particularly preferred designs of the flowmeter according to the invention, the ultrasonic transducers are designed with features of the ultrasonic transducer according to the invention described above. Accordingly, all explanations made in connection with the ultrasonic transducer according to the invention with respect to preferred designs and their advantages can also be transferred analogously to the ultrasonic flowmeter according to the invention and apply accordingly.

In a particularly preferred design of the ultrasonic flowmeter, the control and evaluation unit is designed such that it evaluates the transmitted signal component as "not received" if the transmitted signal component is below a predetermined limit value. The limit value can be, for example, an intensity value or an amplitude value. This design takes into account that propagation of the ultrasonic signal also occurs in principle despite an empty measuring tube, but that the ultrasonic signal is very strongly attenuated. It is therefore conceivable that an—albeit extremely low—ultrasonic signal—transmitted signal component—can be received despite an empty measuring tube. If, however, the transmitted signal component is below the limit value specified—in particular by a user—, the measuring tube is nevertheless determined as being "empty".

The invention also relates to a method for monitoring the function of an ultrasonic transducer. The ultrasonic transducer has a transducer housing and a transducer element, wherein the transducer housing has an ultrasound window and wherein the transducer element is arranged in the transducer housing and is designed to transmit ultrasonic signals onto a signal path and to receive ultrasonic signals from the signal path. Likewise, the ultrasonic transducer has a control and evaluation unit for controlling the transducer element and for evaluating the ultrasonic signals. In addition, a buffer element is provided, which is arranged in the signal path of the ultrasonic signals and forms, in the signal path, at least one at least partially reflecting boundary layer to an environment of the buffer element. In one variation, a second transducer element is arranged in the transducer housing of the ultrasonic transducer.

The method according to the invention is characterized in that an ultrasonic signal is first transmitted in a transmitting step, wherein the ultrasonic signal is at least partially reflected at the boundary layer. The ultrasonic signal is transmitted by the transducer element of the ultrasonic transducer. In a subsequent receiving step, the reflected signal component is received by the transducer element of the ultrasonic transducer or a second transducer element arranged in the transducer housing. In a monitoring step, the receiving of the reflected signal component is monitored. In case of failure to receive a reflected signal component, the failure is detected and an error state is signaled in a signaling step.

The method according to the invention forms a very simple way of testing an ultrasonic transducer for its operability, and this without the need for separate test equipment. If a reflected signal component is received, it must have been previously transmitted, and the transducer element must therefore be operational. If the reflected signal component is not received, a user must assume that no ultrasonic signal has been transmitted and that the transducer element is in an error state, such as defective.

In a preferred design of the method according to the invention, a variable describing the reflecting signal component, in particular the intensity of the reflected signal component, is compared with a reference value in a comparison step, and an error signal is output in the event of a deviation beyond a predetermined tolerance value. This supplementary method step enables a more comprehensive functional test of the ultrasonic transducer, since it is not only monitored whether the transducer element transmits an ultrasonic signal, but also whether the transmitted ultrasonic signal changes, for example because the transducer element has changed its position in the transducer housing.

The method according to the invention is particularly suitable for monitoring the function of the ultrasonic transducer according to the invention described above. Accordingly, all the explanations which have been made with respect to the ultrasonic transducer can be applied analogously to the method.

Furthermore, the invention relates to a method for operating an ultrasonic flowmeter, wherein the ultrasonic flowmeter comprises a first ultrasonic transducer, a second ultrasonic transducer and a control and evaluation unit. The ultrasonic transducers are designed to transmit an ultrasonic signal onto a signal path and/or to receive an ultrasonic signal from the signal path and are operatively associated with each other via the signal path of the ultrasonic signal. At least one ultrasonic transducer configured for transmission comprises a buffer element, wherein the buffer element is arranged in the signal path of the ultrasonic signal and the buffer element forms at least one at least partially reflective boundary layer in the signal path.

The method according to the invention is characterized in that, in a transmitting step, the transmitting transducer element transmits an ultrasonic signal, wherein the ultrasonic signal is at least partially reflected and partially transmitted at the boundary layer of the buffer element. In a receiving step, the transducer element of the transmitting ultrasonic transducer or a second transducer element arranged in the transmitting ultrasonic transducer receives the reflected signal component and the transducer element of the receiving ultrasonic transducer receives the transmitted signal component. In a monitoring step, the control and evaluation unit monitors the reception of the reflected signal component and the reception of the transmitted signal component. In a subsequent signaling step, one of the following operating states of the ultrasonic flowmeter is signaled by the control and evaluation unit:

- if the reflected signal component is received and the transmitted signal component is received: ultrasonic flowmeter operational,
- if the reflected signal component is received and the transmitted signal component is not received: measuring tube empty,
- if the reflected signal component is not received and the transmitted signal component is not received: ultrasonic flowmeter in error state, in particular transducer element of the transmitting ultrasonic transducer in error state.

The method according to the invention makes it possible to distinguish in a simple manner between an error state of a transducer element or an ultrasonic transducer and an empty measuring tube. A particularly preferred design of the method according to the invention is characterized in that the transmitted signal component is evaluated as "not received" if the transmitted signal component is below a predetermined limit value. The limit value can be based, for example, on an intensity value or an amplitude value. This design of the method enables the detection of an empty measuring tube even if the transmitted ultrasonic signals are not completely attenuated.

The method according to the invention is particularly suitable for operating the ultrasonic flowmeter according to the invention described above. Accordingly, all the explanations which have been made with respect to the ultrasonic flowmeter can be applied analogously to the method.

BRIEF DESCRIPTION OF THE DRAWINGS

In detail, there is a plurality of possibilities for designing and further developing the ultrasonic transducer according to the invention and the ultrasonic flowmeter. In addition, there is a plurality of possibilities for carrying out the methods according to the invention. In this regard, reference is made to the following description of preferred embodiments in conjunction with the drawings.

DETAILED DESCRIPTION

Figure 1:
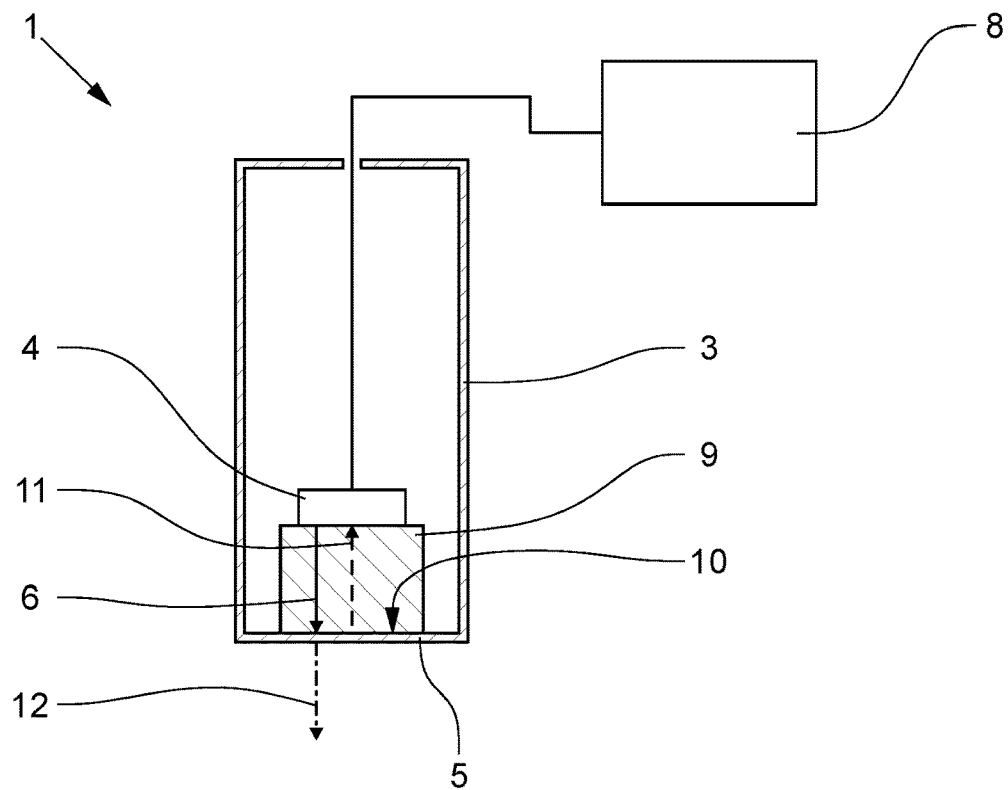
FIG. 1 illustrates a first embodiment of an ultrasonic transducer.
Figure 4:
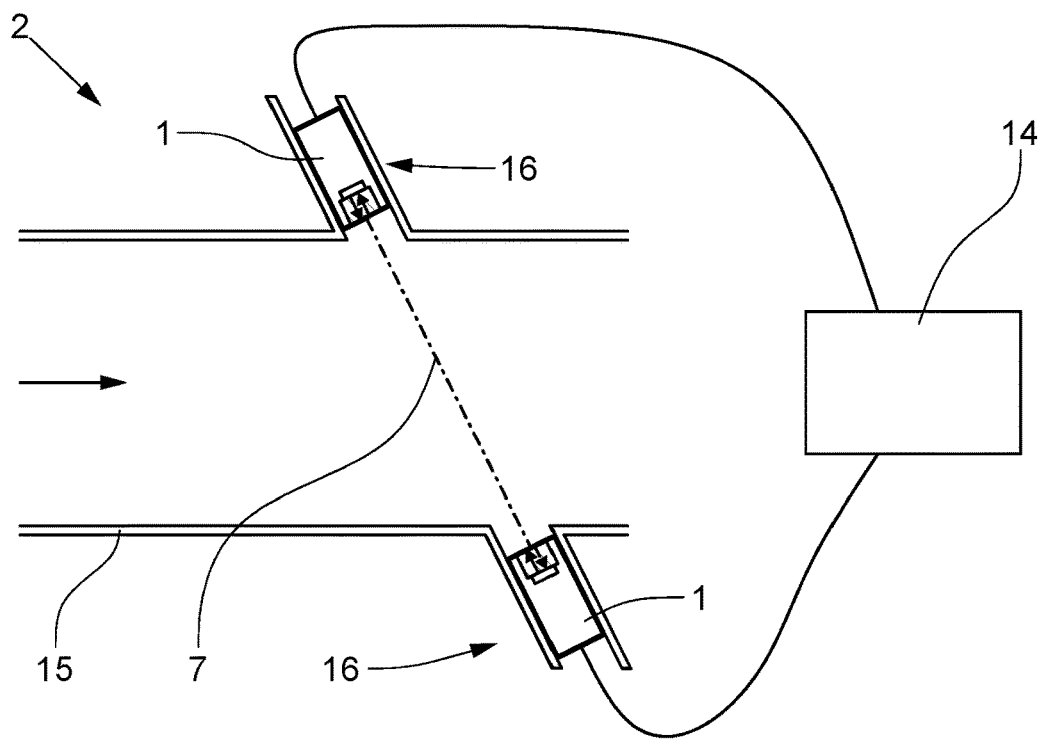
FIG. 4 illustrates a first variation of an ultrasonic flowmeter.

FIG. 1 shows an ultrasonic transducer 1 for an ultrasonic flowmeter 2 shown in FIG. 4. The ultrasonic transducer 1 has a transducer housing 3 and a transducer element 4. The transducer housing has an ultrasound window 5 through which ultrasound waves are transmitted or received by the ultrasonic transducer 1. The transducer element 4 is arranged in the transducer housing 3 and is used to transmit ultrasonic signals 6 to a signal path 7 or to receive ultrasonic signals 6 from the signal path 7. In addition, the ultrasonic transducer 1 has a control and evaluation unit 8 for controlling the transducer element 4 and evaluating the ultrasonic signals 6. In the ultrasonic transducer 1 shown in FIG. 1, a buffer element 9 is arranged in the transducer housing 3 in the signal path 7. The buffer element 9 forms a partially reflective boundary layer 10 in the signal path 7, which is located on the side of the buffer element 9 facing away from the transducer element 4. In the operating state of the ultrasonic transducer 1, the transducer element 4 emits an ultrasonic signal 6 that is at least partially reflected at the boundary layer 10, as shown in FIG. 1. The reflected signal component 11 is indicated by a dashed line. The transmitted signal component 12 is also shown, which is indicated by a dot-dashed line. The transducer element 4 receives the reflected signal component 11 again. The ultrasonic transducer 1 shown has the special feature that the control and evaluation unit 8 is designed such that—in the operating state of the ultrasonic transducer 1—it monitors the reception of the reflected signal component 11. If the reflected signal component 11 is received by the transducer element 4, the ultrasonic transducer 1 is in an operational state. However, if the reflected signal component 11 is not received, i.e., if no signal is received by the transducer element 4, the control and evaluation unit 8 detects an error state of the ultrasonic transducer 1. Furthermore, the control and evaluation unit 8 shown is designed in such a way that it also signals the error state. Furthermore, the control and evaluation unit 8 is designed to compare the intensity of the reflected signal component 11 with a reference value for the intensity of the reflected signal component 11 for the go state of the ultrasonic transducer 1. If the deviation exceeds a predetermined tolerance range, the control and evaluation unit detects an error state. This is the case, for example, if the transducer element 4 has become detached and changed its position within the transducer housing 3.

The design of the ultrasonic transducer 1 shown in FIG. 1 has a buffer element 9, which is designed as a separate component. The buffer element 9 is formed inside the transducer housing 3 and is arranged between the transducer element 4 and the ultrasound window 5. The reflective boundary layer 10 is formed here between the buffer element 9 and the ultrasound window 5.

Figure 2:
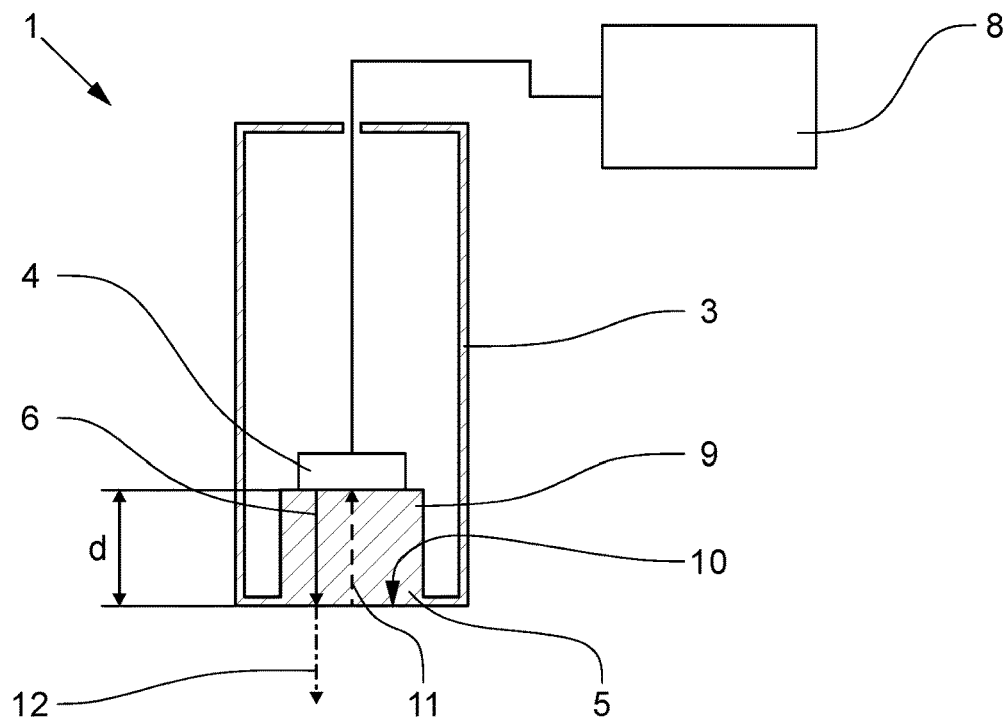
FIG. 2 illustrates a second embodiment of an ultrasonic transducer.
Figure 3:
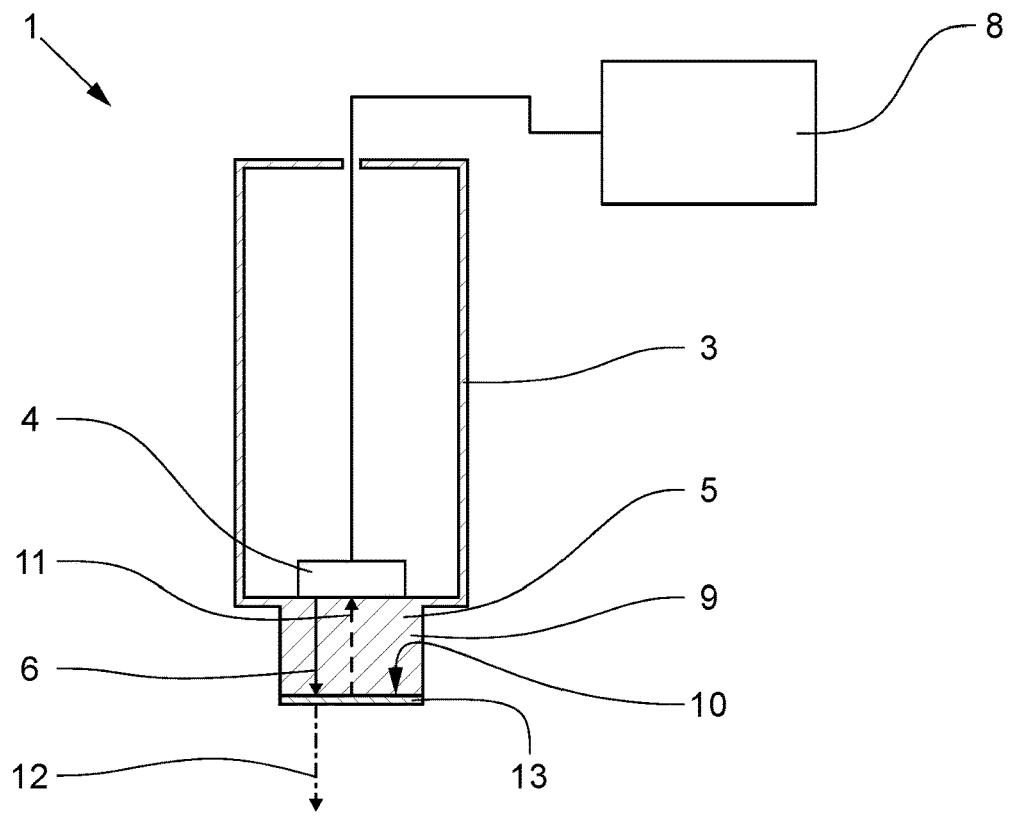
FIG. 3 illustrates a third embodiment of an ultrasonic transducer.

In contrast to the design shown in FIG. 1, ultrasonic transducers 1 are shown in FIGS. 2 and 3, in which the buffer element 9 is formed by the ultrasound window 5. In the embodiment shown in FIG. 2, the ultrasound window 5 has a thickness d and projects into the transducer housing 3. In the embodiment shown in FIG. 3, the ultrasound window 5 projects into the outer space of the ultrasonic transducer 1.

In the ultrasonic transducer 1 shown in FIG. 3, the buffer element 9 has a coating 13 on its side facing away from the transducer element 4, which serves to improve, e.g., increase, the reflection properties of the boundary layer 10.

FIG. 4 shows an ultrasonic flowmeter 2 that has two of the ultrasonic transducers 1 shown in FIG. 1. In addition, the ultrasonic flowmeter 2 has a control and evaluation unit 14. In the illustrated embodiment, both ultrasonic transducers 2 are designed both for transmitting ultrasonic signals 6 and for receiving ultrasonic signals 6. The two ultrasonic transducers 1 are arranged on opposite sides of the measuring tube 15 and are also arranged offset from each other in the direction of flow, indicated by the arrow. The two ultrasonic transducers are operatively associated with each other via the signal path 7. In the embodiment shown, the ultrasonic transducers 1 are arranged in transducer pockets 16 of the measuring tube 15. In the operating state of the ultrasonic flowmeter 2, the transducer element 4 of a transmitting ultrasonic transducer 1 transmits an ultrasonic signal 6, wherein the ultrasonic signal 6 is at least partially reflected and partially transmitted at the boundary layer 10 of the buffer element 9 of the transmitting ultrasonic transducer 1. The reflected signal component 11 is then received by the transducer element 4 of the transmitting ultrasonic transducer 1, and the transmitted signal component 12 is received by the transducer element 4 of the receiving ultrasonic transducer 1.

The control and evaluation unit 14 of the ultrasonic flowmeter 2 is designed to monitor the reception of the reflected signal component 11 and the reception of the transmitted signal component 12 in the operating state of the ultrasonic flowmeter 2. Depending on which signal components are received by the transducer elements 4, the control and evaluation unit 14 detects and signals one of the following operating states of the ultrasonic flowmeter 2:

- if the reflected signal component is received and the transmitted signal component is received: ultrasonic flowmeter operational,
- if the reflected signal component is received and the transmitted signal component is not received: measuring tube empty,
- if the reflected signal component is not received and the transmitted signal component is not received: ultrasonic flowmeter in an error state, in particular transducer element of the transmitting ultrasonic transducer in an error state.

In the illustrated embodiment of the ultrasonic flowmeter 2, the ultrasonic transducers 1 are designed according to the embodiment shown in FIG. 1. However, one of the other embodiments or a mixture, i.e., a different embodiment of the two ultrasonic transducers 1 is also conceivable. The control and evaluation unit 14 is further designed in such a way that it evaluates the transmitted signal component 12 as "not received" if the transmitted signal component 12 is below a predetermined limit value. In the present case, an intensity value of the transmitted signal component 12 is used as the limit value.

Figure 5:
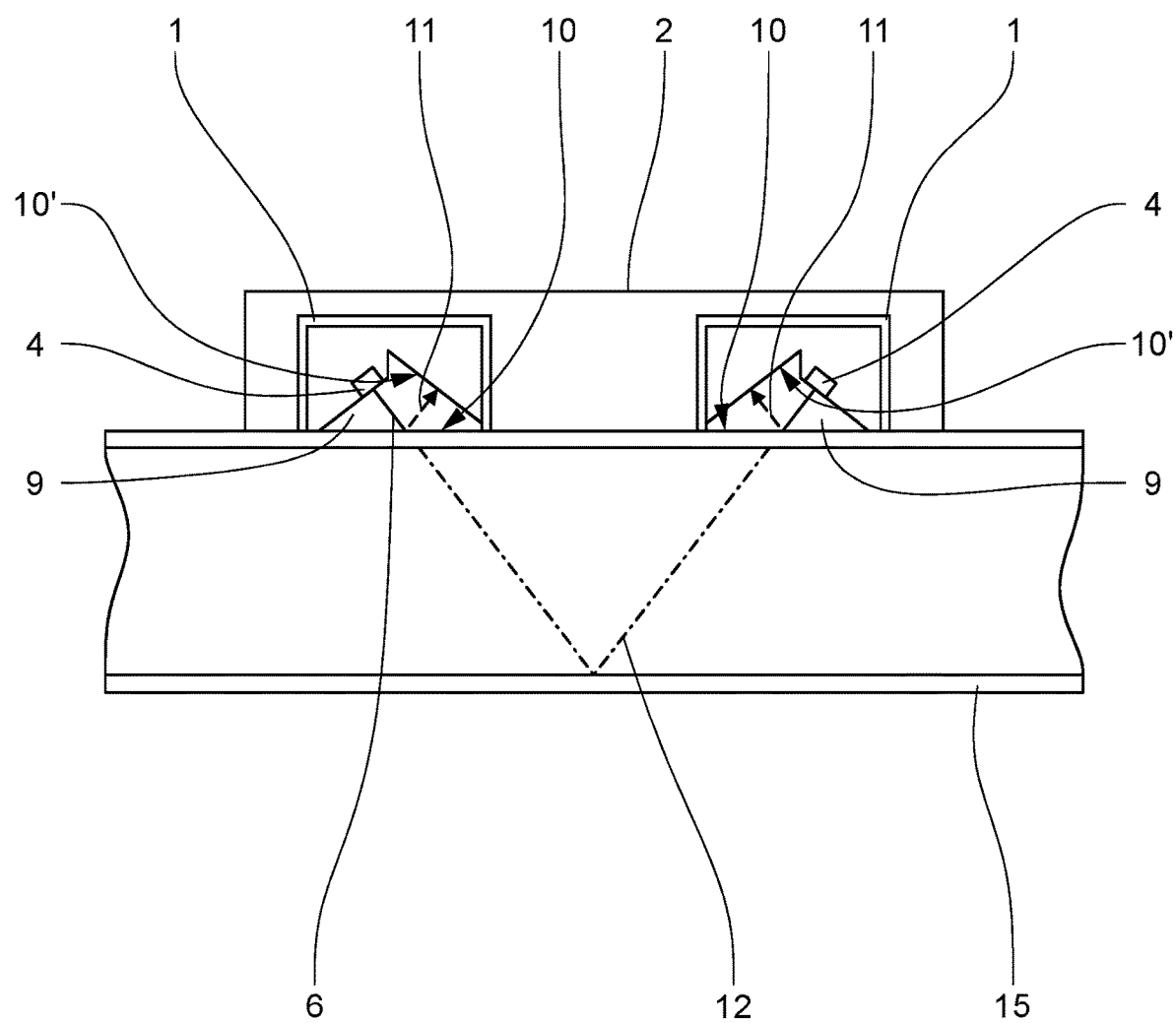
FIG. 5 illustrates a second variation of an ultrasonic flowmeter.

FIG. 5 shows an ultrasonic flowmeter 2, which is designed as a clamp-on ultrasonic flowmeter. The ultrasonic flowmeter 2 is clamped onto the measuring tube 15 from the outside. The clamping mechanism is not shown here, as it is not relevant to the present invention. The ultrasonic flowmeter 2 has two ultrasonic transducers 1. Both ultrasonic transducers 1 each have a transducer element 4 and a buffer element 9. The transducer elements 4 are aligned here in such a way that they radiate at an oblique angle onto the measuring tube surface. This is implemented by the buffer element 9, or buffer elements 9, having a substantially triangular cross-section. In the present embodiment, the signal paths of the ultrasonic signals 6 are shown only schematically, since the course of the signal paths 6 depends on the materials used for the buffer element 9, the measuring tube 15 and also the medium that is transported in the measuring tube 15. The transducer element 4 of the transmitting ultrasonic transducer 2 transmits an ultrasonic signal 6, which is reflected at the boundary layer 10 formed between the buffer element 9 and the measuring tube surface. Here, the angle of incidence corresponds to the angle of reflection, so that the reflected signal component 11 is reflected at the same angle as it strikes the boundary layer 10. The reflected signal component 10 then strikes a second boundary layer 10', which forms the buffer element 9. From here, the reflected signal component 11 is reflected back to the boundary layer 10 and from there reflected back to the transducer element 4, which receives the reflected signal component. The transmitted signal component 12 is transmitted into the measuring tube 15 and is reflected at the inside of the measuring tube towards the second transducer element 4 of the second ultrasonic transducer 2. This transducer element 4 then receives the transmitted signal component 12.

Figure 6:
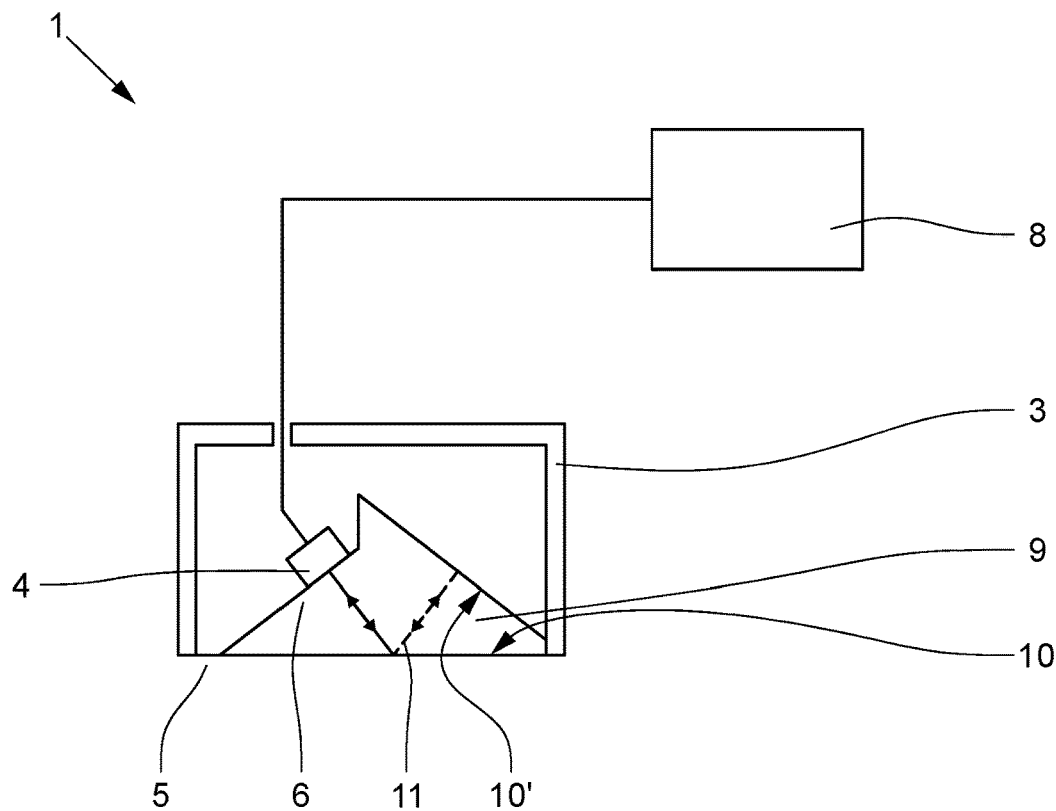
FIG. 6 illustrates a fourth embodiment of an ultrasonic transducer.

FIG. 6 shows the ultrasonic transducer of the ultrasonic flowmeter 2 shown in FIG. 5. The ultrasonic transducer 1 has a housing 3 in which a transducer element 4 is located. The ultrasonic transducer 1 has a buffer element 9 which forms a first boundary layer 10 and a second boundary layer 10' in the beam path of the ultrasonic signal 6. As already explained in connection with FIG. 5, the transducer element 4 transmits ultrasonic signals 6 which are partially reflected at the boundary layer 10. The angle of incidence of the reflected signal component 11 corresponds to the angle of incidence of the ultrasonic signal 6. The reflected signal component 11 is reflected towards the second boundary layer 10' and strikes the second boundary layer 10' perpendicularly. From here, the reflected signal component is reflected back to the boundary layer 10 again and from here is reflected back to the transducer element 4. The control and evaluation unit 8 of the ultrasonic transducer 1 is designed such that it monitors the reception of the reflected signal component 11 and detects an error state of the ultrasonic transducer 1 in the absence thereof.

Figure 7:
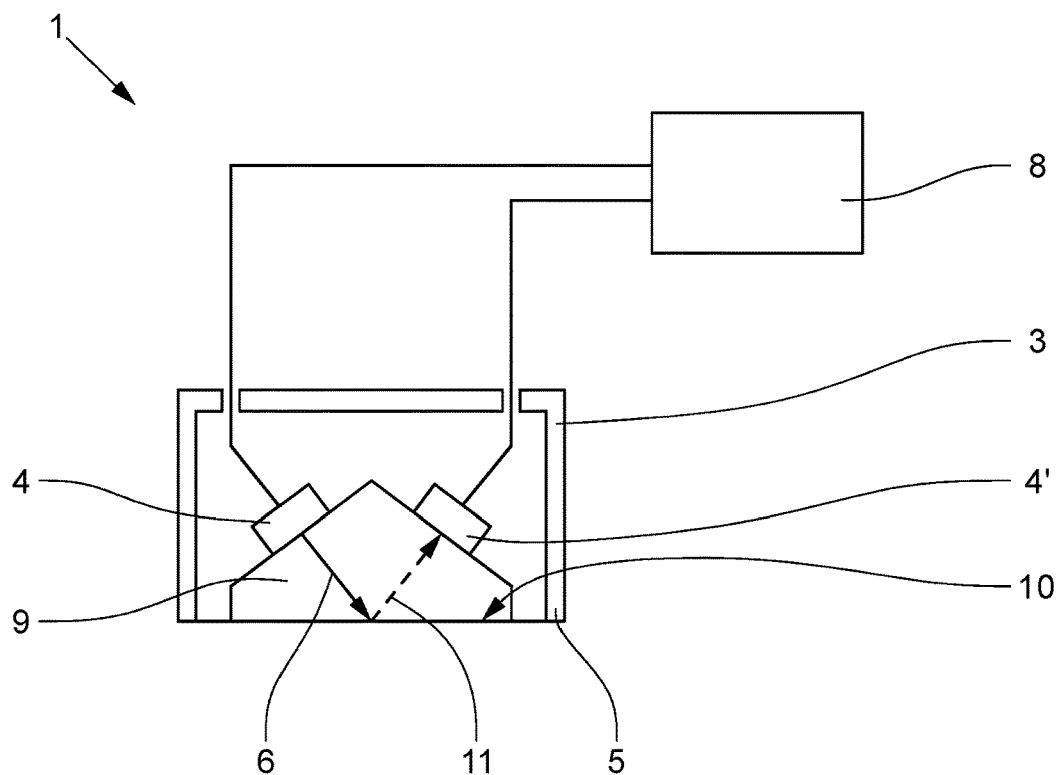
FIG. 7 illustrates a fifth embodiment of an ultrasonic transducer.

An alternative embodiment of an ultrasonic transducer 1 is shown in FIG. 7. Here, the ultrasonic transducer 1 comprises a first transducer element 4 designed and used for transmitting and receiving ultrasonic signals. However, the ultrasonic transducer 1 also has a second transducer element 4' that is used to receive the reflected signal component 11. In contrast to the embodiment shown in FIG. 6, the reflected signal component 11 is thus not reflected back to the transducer element 4 here, but is received by the transducer element 4'. The control and evaluation unit 8 is then designed to monitor the reception of the reflected signal component 11 from the second transducer element 4'. In the absence of the reflected signal component 11, the control and evaluation unit 8 detects an error state.

Figure 8:
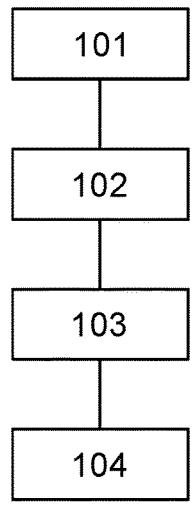
FIG. 8 illustrates a method for monitoring the function of an ultrasonic transducer.

FIG. 8 shows a method 100 for the monitoring of the function of an ultrasonic transducer as shown in FIGS. 1 to 3 and 6. In a transmitting step 101, an ultrasonic signal is transmitted, wherein the ultrasonic signal is at least partially reflected at the boundary layer. In a receiving step 102 the reflected signal component is received by the transducer element. In a monitoring step 103, the reception of the reflected signal component is monitored, and a signaling step 104 is carried out to signal an error state in case of failure to receive a reflected signal component.

Figure 9:
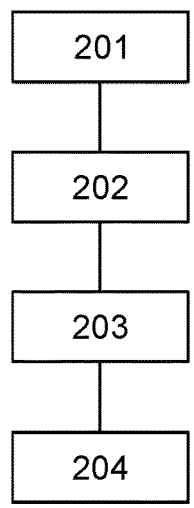
FIG. 9 illustrates a method for operating an ultrasonic flowmeter.

FIG. 9 shows a method 200 for operating an ultrasonic flowmeter as illustrated in FIG. 4. In the method shown, in a transmitting step 201, an ultrasonic signal is transmitted by the transmitting transducer element, wherein the ultrasonic signal is at least partially reflected and partially transmitted at the boundary layer of the buffer element. In a receiving step 202, the transducer element of the transmitting ultrasonic transducer receives the reflected signal component and the transducer element of the receiving ultrasonic transducer receives the transmitted signal component. In a monitoring step 203, the control and evaluation unit monitors the reception of the reflected signal component and the reception of the transmitted signal component. In a signaling step 204, one of the following operating states of the ultrasonic flowmeter is signaled by the control and evaluation unit:

- if the reflected signal component (11) is received and the transmitted signal component (12) is received: ultrasonic flowmeter (1) operational,
- if the reflected signal component (11) is received and the transmitted signal component (12) is not received: measuring tube (15) empty,
- if the reflected signal component (11) is not received and the transmitted signal component (12) is not received: ultrasonic flowmeter (2) in an error state, in particular transducer element (4) of the transmitting ultrasonic transducer (1) in an error state.

In the presented method, the transmitted signal component is then evaluated as "not received" if the transmitted signal component is below a predetermined limit value.

An intensity value of the transmitted signal component is specified here as a limit value.

The invention claimed is:

1. An ultrasonic transducer for an ultrasonic flowmeter, comprising:
    a transducer housing and having a transducer element, wherein the transducer housing has an ultrasound window and wherein the transducer element is arranged in the transducer housing and is designed for transmitting ultrasonic signals onto a signal path and for receiving ultrasonic signals from the signal path;
    a control and evaluation unit for controlling the transducer element and evaluating the ultrasonic signals; and
    a buffer element arranged in or on the transducer housing in the signal path, wherein the buffer element forms at least one at least partially reflective boundary layer in the signal path;
    wherein, in the operating state of the ultrasonic transducer, the transducer element transmits an ultrasonic signal, wherein the ultrasonic signal is at least partially reflected at the boundary layer of the buffer element, wherein the reflected signal component is received by the transducer element;
    wherein the control and evaluation unit is configured such that, in the operating state of the ultrasonic transducer, the control and evaluation unit monitors the reception of the reflected signal component and, in the absence of reception of a reflected signal component, detects an error state of the ultrasonic transducer; and
    wherein either: (i) the buffer element is formed by the ultrasound window; or (ii) the buffer element is formed as a separate component arranged between the transducer element and the ultrasound window.

2. The ultrasonic transducer according to claim 1, wherein the buffer element forms at least a second at least partially reflecting boundary layer in the signal path; and
    wherein in the operating state of the ultrasonic transducer, the reflected signal component is reflected at the first boundary layer to the second boundary layer.

3. The ultrasonic transducer according to claim 1, wherein a coating which enhances the partial reflection is applied to the at least one at least partially reflective boundary layer.

4. The ultrasonic transducer according to claim 1, wherein the control and evaluation unit is designed such that, in the operating state of the ultrasonic transducer, the control and evaluation unit compares a variable describing the reflected signal component with a reference value, and outputs an error signal in the event of a deviation beyond a predetermined tolerance range.

5. The ultrasonic transducer according to claim 4, wherein the variable describing the reflected signal component is an intensity of the reflected signal component.

6. An ultrasonic transducer for an ultrasonic flowmeter, comprising:
    a transducer housing and a transducer element, wherein the transducer housing has an ultrasound window, and wherein the transducer element is arranged in the transducer housing and is designed for transmitting ultrasonic signals onto a signal path and for receiving ultrasonic signals from the signal path;
    a control and evaluation unit for controlling the transducer element and evaluating the ultrasonic signals;
    a buffer element arranged in or on the transducer housing in the signal path, wherein the buffer element forms at least one at least partially reflective boundary layer in the signal path; and
    a second transducer element arranged in the transducer housing;
    wherein, in the operating state of the ultrasonic transducer, the transducer element transmits an ultrasonic signal, wherein the ultrasonic signal is at least partially reflected at the boundary layer of the buffer element, wherein the second transducer element is arranged in the transducer housing such that the reflected signal component is received by the second transducer element;
    wherein the control and evaluation unit is configured such that, in the operating state of the ultrasonic transducer, the control and evaluation unit monitors the reception of the reflected signal component and, in the absence of reception of a reflected signal component, detects an error state of the ultrasonic transducer; and
    wherein either: (i) the buffer element is formed by the ultrasound window; or (ii) the buffer element is formed as a separate component arranged between the transducer element and the ultrasound window.

7. The ultrasonic transducer according to claim 6, wherein the buffer element forms at least a second at least partially reflecting boundary layer in the signal path; and
    wherein in the operating state of the ultrasonic transducer, the reflected signal component is reflected at the first boundary layer to the second boundary layer.

8. The ultrasonic transducer according to claim 6, wherein a coating which enhances the partial reflection is applied to the at least one at least partially reflective boundary layer.

9. The ultrasonic transducer according to claim 6, wherein the control and evaluation unit is designed such that, in the operating state of the ultrasonic transducer, the control and evaluation unit compares a variable describing the reflected signal component with a reference value, and outputs an error signal in the event of a deviation beyond a predetermined tolerance range.

10. An ultrasonic flowmeter for determining the flow of a flowing medium, comprising:
   a first ultrasonic transducer and a second ultrasonic transducer and having a control and evaluation unit, wherein the ultrasonic transducers are designed to transmit an ultrasonic signal onto a signal path and/or to receive an ultrasonic signal from the signal path and are operatively connected to one another via the signal path of the ultrasonic signal;
   wherein at least the ultrasonic transducer designed for transmission has a buffer element, wherein the buffer element is arranged in the signal path of the ultrasonic signal in or on the transducer housing, wherein the buffer element forms at least one at least partially reflective boundary layer in the signal path;
   wherein, in the operating state of the ultrasonic flowmeter, the transducer element of the transmitting ultrasonic transducer transmits an ultrasonic signal, wherein the ultrasonic signal is at least partially reflected at the boundary layer of the buffer element and is partially transmitted;
   wherein either:
      the reflected signal portion is received by the transducer element of the transmitting ultrasonic transducer and the transmitted signal portion is received by the transducer element of the receiving ultrasonic transducer;
   or
      a second transducer element is arranged in the transducer housing of the ultrasonic transducer designed for transmission, and the reflected signal component is received by the second transducer element of the transmitting ultrasonic transducer and the transmitted signal component is received by the transducer element of the receiving ultrasonic transducer; and
   wherein the control and evaluation unit is configured such that, in the operating state of the ultrasonic flowmeter, the control and evaluation unit monitors the reception of the reflected signal component and the reception of the transmitted signal component and detects and signals one of the following operating states of the ultrasonic flowmeter:
      if the reflected signal component is received and the transmitted signal component is received: ultrasonic flowmeter operational;
      if the reflected signal component is received and the transmitted signal component is not received: measuring tube empty;
      if the reflected signal component is not received and the transmitted signal component is not received: ultrasonic flowmeter in error state.

11. The ultrasonic flowmeter according to claim 10, wherein at least one ultrasonic transducer is designed such that the buffer element is formed as a separate component arranged between the transducer element and an ultrasound window of the transducer housing.

12. The ultrasonic flowmeter according to claim 10, wherein the control and evaluation unit is designed to evaluate the transmitted signal component as "not received" if the transmitted signal component is below a predetermined limit value.

13. The ultrasonic flowmeter according to claim 10, wherein at least one ultrasonic transducer is designed such that the buffer element is formed by an ultrasound window of the transducer housing.

14. A method for operating an ultrasonic flowmeter, wherein the ultrasonic flowmeter has a first ultrasonic transducer, a second ultrasonic transducer and a control and evaluation unit, wherein the ultrasonic transducers are designed to transmit an ultrasonic signal onto a signal path and/or to receive an ultrasonic signal from the signal path and are operatively connected to one another via the signal path of the ultrasonic signal, wherein at least the ultrasonic transducer configured for transmission has a buffer element, the buffer element is arranged in or on the transducer housing in the signal path of the ultrasonic signal, and the buffer element forms at least one at least partially reflective boundary layer in the signal path, the method comprising:
   a transmitting step, in which the transmitting transducer element transmits an ultrasonic signal, wherein the ultrasonic signal is at least partially reflected and partially transmitted at the boundary layer of the buffer element;
   a receiving step, in which the transducer element of the transmitting ultrasonic transducer or a second transducer element arranged in the transmitting ultrasonic transducer receives the reflected signal component and the transducer element of the receiving ultrasonic transducer receives the transmitted signal component;
   a monitoring step, in which the control and evaluation unit monitors the reception of the reflected signal component and the reception of the transmitted signal component; and
   a signaling step, in which one of the following operating states of the ultrasonic flowmeter is signaled by the control and evaluation unit:
      if the reflected signal component is received and the transmitted signal component is received: ultrasonic flowmeter operational;
      if the reflected signal component is received and the transmitted signal component is not received: measuring tube empty;
      if the reflected signal component is not received and the transmitted signal component is not received: ultrasonic flowmeter in error state.

15. The method according to claim 14, wherein the transmitted signal portion is evaluated as "not received" if the transmitted signal portion is below a predetermined limit value.

* * * * *